(12) United States Patent
Ye et al.

(10) Patent No.: US 11,423,638 B2
(45) Date of Patent: Aug. 23, 2022

(54) MULTIZONE ILLUMINATION FOR OPTICAL FACE IDENTIFICATION

(71) Applicant: Shenzhen Goodix Technology Co., Ltd., Shenzhen (CN)

(72) Inventors: Jianhui Ye, San Diego, CA (US); Bo Pi, San Diego, CA (US)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 192 days.

(21) Appl. No.: 16/828,848

(22) Filed: Mar. 24, 2020

(65) Prior Publication Data

US 2020/0364489 A1 Nov. 19, 2020

Related U.S. Application Data

(60) Provisional application No. 62/824,226, filed on Mar. 26, 2019.

(51) Int. Cl.
*G06V 10/60* (2022.01)
*G06V 40/16* (2022.01)
*G06F 3/01* (2006.01)
*H04N 5/33* (2006.01)

(52) U.S. Cl.
CPC .......... *G06V 10/60* (2022.01); *G06V 40/169* (2022.01); *G06F 3/011* (2013.01); *G06V 40/162* (2022.01); *G06V 40/172* (2022.01); *H04N 5/33* (2013.01)

(58) Field of Classification Search
None
See application file for complete search history.

(56) References Cited

U.S. PATENT DOCUMENTS

| | | | |
|---|---|---|---|
| 8,160,311 B1* | 4/2012 | Schaefer ............... G06F 3/013 | 382/118 |
| 2007/0047774 A1* | 3/2007 | Yukhin ............ G06K 9/00201 | 382/118 |
| 2008/0240502 A1 | 10/2008 | Freedman et al. | |

(Continued)

FOREIGN PATENT DOCUMENTS

| | | |
|---|---|---|
| CN | 101571911 A | 11/2009 |
| CN | 102933934 A | 2/2013 |

(Continued)

OTHER PUBLICATIONS

Extended European Search Report dated May 10, 2021 for European Patent Application No. 20779284.7 (7 pages).

(Continued)

*Primary Examiner* — Santiago Garcia
(74) *Attorney, Agent, or Firm* — Perkins Coie LLP

(57) ABSTRACT

An optical sensor module for sensing a face of a person for user identification and authentication, where a face illumination module is provided to use an array of face illumination light sources arranged in a regular array pattern to produce illumination light which may be invisible light such as infrared light and an optical diffraction element that is located to receive illumination light beams from the face illumination light sources and to transfer each illumination light beam from each face illumination light source in the array into a patterned light beam containing illumination light spots.

20 Claims, 7 Drawing Sheets

(56) References Cited

U.S. PATENT DOCUMENTS

| | | | |
|---|---|---|---|
| 2017/0038505 A1* | 2/2017 | Chern | G02B 27/20 |
| 2018/0157342 A1 | 6/2018 | Romano et al. | |
| 2019/0025590 A1* | 1/2019 | Haddick | G02B 27/141 |
| 2019/0041197 A1 | 2/2019 | Gernoth et al. | |
| 2019/0222346 A1* | 7/2019 | MacKinnon | H04B 10/25891 |
| 2019/0259927 A1* | 8/2019 | Chern | H01S 5/02253 |
| 2019/0302467 A1* | 10/2019 | MacKinnon | G02B 19/0066 |

FOREIGN PATENT DOCUMENTS

| | | |
|---|---|---|
| CN | 107637074 A | 1/2018 |
| CN | 108052878 A | 5/2018 |
| CN | 108988121 A | 12/2018 |
| CN | 109299662 A | 2/2019 |
| CN | 109325394 A | 2/2019 |
| WO | 2016154218 A1 | 9/2016 |

OTHER PUBLICATIONS

International Search Report dated May 29, 2020 for International Patent Application No. PCT/CN2020/078010, filed Mar. 5, 2020 (4 pages).
Geng, Jason. Structured-light 3D surface imaging: a tutorial. IEEE Intelligent Transportation System Society, 11001 Sugarbush Terrance, Rockville, Maryland 20852. Mar. 31, 2011 (pp. 1-33).
Vandenhouten, Ralf et al. Design and quality metrics of point patterns for coded structured light illumination with diffractive optical elements in optical 3D sensors. Proc. SPIE 10335, Digital Optical Technologies 2017, 1033518 (Jun. 26, 2017) (pp. 1-13).
MacWilliams, F.J. et al. Pseudo-random sequences and arrays. Proceedings of the IEEE, vol. 64, No. 12, pp. 1715-1729, Dec. 1976.
Chinese Office Action dated Mar. 23, 2022 for Chinese Patent Application No. 202080001118.X (10 pages).
European Application No. 20779284.7, Office Action dated Feb. 8, 2022 (5 pages).

* cited by examiner

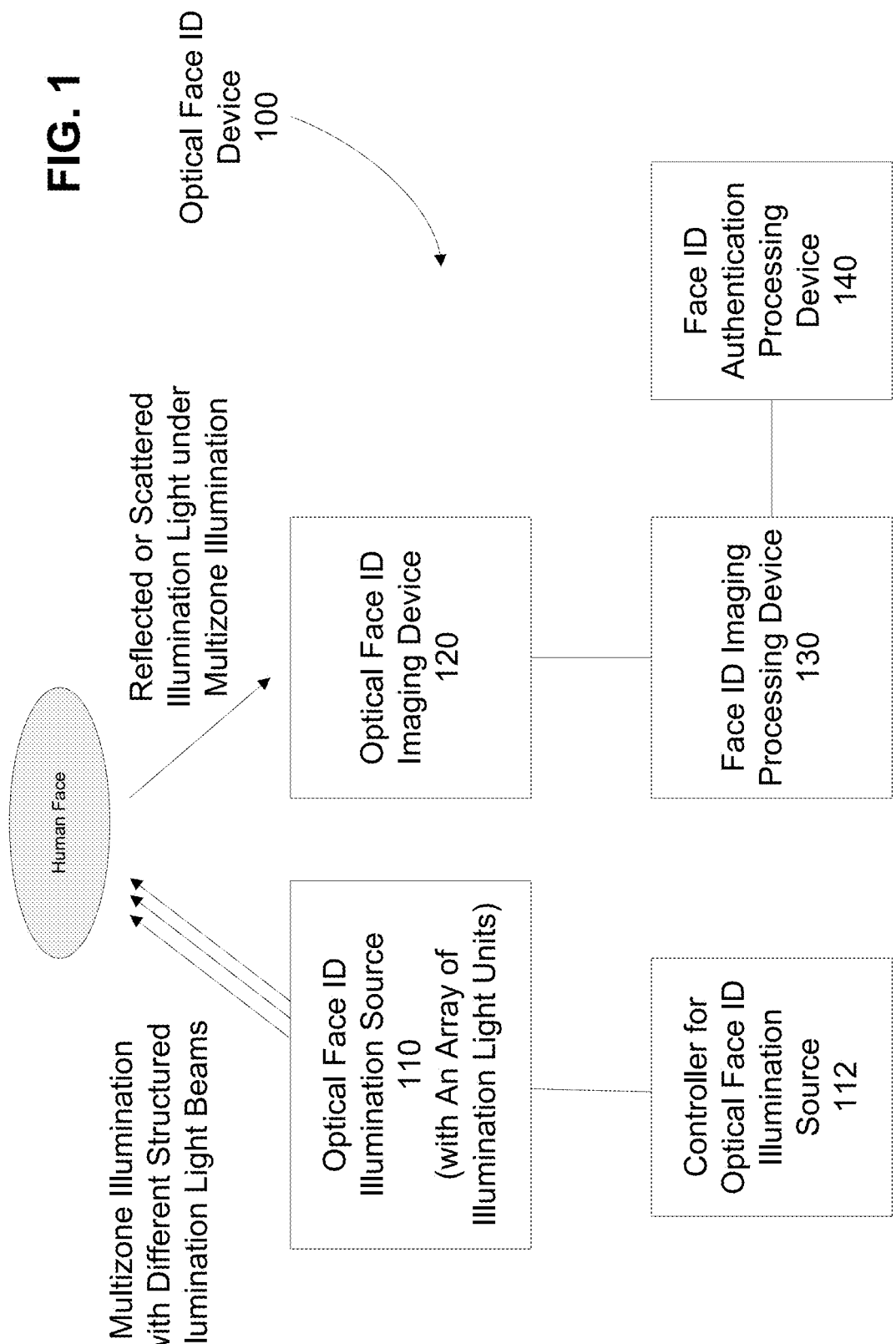

MULTIZONE ILLUMINATION FOR OPTICAL FACE IDENTIFICATION

PRIORITY CLAIM AND RELATED APPLICATION

This patent document claims the priority and benefits of U.S. Application No. 62/824,226 entitled "MULTIZONE ILLUMINATION FOR OPTICAL FACE IDENTIFICATION" and filed by Applicant Shenzhen Goodix Technology Co., Ltd. on Mar. 26, 2019, the entire disclosure of which is incorporated by reference as part of this patent document.

TECHNICAL FIELD

This patent document relates to optical sensing of a person's face in electronic devices or systems, including portable devices such as a mobile device or a wearable device and larger systems.

BACKGROUND

Various sensors can be implemented in electronic devices or systems to provide certain desired functions. There is an increasing need for securing access to computers and computer-controlled devices or systems where only authorized users be identified and be distinguished from non-authorized users.

For example, mobile phones, digital cameras, tablet PCs, notebook computers and other portable electronic devices have become more and more popular in personal, commercial and governmental uses. Portable electronic devices for personal use may be equipped with one or more security mechanisms to protect the user's privacy.

For another example, a computer or a computer-controlled device or system for an organization or enterprise may be secured to allow only authorized personnel to access to protect the information or the use of the device or system for the organization or enterprise.

The information stored in portable devices and computer-controlled databases, devices or systems, may be of certain characteristics that should be secured. For example, the stored information may be personal in nature, such as personal contacts or phonebook, personal photos, personal health information or other personal information, or confidential information for proprietary use by an organization or enterprise, such as business financial information, employee data, trade secrets and other proprietary information. If the security of the access to the electronic device or system is compromised, the data may be accessed by others that are not authorized to gain the access, causing loss of privacy of individuals or loss of valuable confidential information. Beyond security of information, securing access to computers and computer-controlled devices or systems also allow safeguard of the use of devices or systems that are controlled by computers or computer processors such as computer-controlled automobiles and other systems such as ATMs.

Security access to a device such as a mobile device or a system such as an electronic database and a computer-controlled system can be achieved in different ways such as using user passwords. A password, however, may be easily to be spread or obtained and this nature of passwords can reduce the level of the security. Moreover, a user needs to remember a password to use password-protected electronic devices or systems, and, if the user forgets the password, the user needs to undertake certain password recovery procedures to get authenticated or otherwise regain the access to the device. Unfortunately, in various circumstances, such password recovery processes may be burdensome to users and have various practical limitations and inconveniences.

The personal identification can be based on fingerprints, facial features for face identification and other personal traits to achieve the user authentication for enhancing the data security while mitigating certain undesired effects associated with passwords.

Electronic devices or systems, including portable or mobile computing devices, may employ user authentication mechanisms to protect personal or other confidential data and prevent unauthorized access. User authentication on an electronic device or system may be carried out through one or multiple forms of biometric identifiers, which can be used alone or in addition to conventional password authentication methods.

SUMMARY

The sensor technology and examples of implementations of the sensor technology described in this patent document provide an optical sensor module for sensing a face of a person for user identification and authentication, where a face illumination module is provided to use an array of face illumination light sources arranged in a regular array pattern to produce illumination light which may be invisible light such as infrared light and an optical diffraction element that is located to receive illumination light beams from the face illumination light sources and to transfer each illumination light beam from each face illumination light source in the array into a patterned light beam containing illumination light spots. In some implementations, the optical diffraction element includes a mask of different adjacent regions with different phase delays to render the illumination light spots to be spatially distributed to have a unique local pattern of spots in each local area that is different from other local regions.

In one aspect, the disclosed technology can be implemented to provide a system including hardware capable of detecting a person's face by optical sensing for securing an access to system. Such a system includes a periodic array of face illumination light sources arranged at different locations from one another, each operable to produce a face illumination light beam and including an optical projection device that projects the face illumination light beam along a face illumination direction that is different from a face illumination direction of an adjacent face illumination light source; and a diffractive optical element structured to include an array of different regions of varying optical thickness values that transmit light and located in optical paths of the face illumination light beams to convert each face illumination light beam into a patterned face illumination light beam that includes a pattern of illumination light spots, such that the different face illumination light beams from the periodic array of face illumination light sources are converted by the diffractive optical element into different patterned face illumination light beams along different illumination directions each including the pattern of illumination light spots to illuminate a person's face for optically detecting a person's face. This system further includes a face imaging device located relative to the face illumination source to receive illumination light from a person's face illuminated by the different patterned face illumination light beams along different illumination directions that carries the person's facial topographical information; a face imaging processing device coupled to receive output of the face imaging device and to extract the person's facial topographical information for face identification; and a face identification authentication processing device coupled to receive the extracted facial topographical information and operable to compare the extracted facial topographical information with known facial topographical information of an authorized user to determine whether the extracted facial topographical information matches the known facial topographical information of the authorized user.

In another aspect, the disclosed technology can be implemented to provide an electronic device capable of detecting a person's face by optical sensing using a face illumination source. This face illumination source includes a periodic array of face illumination light sources arranged at different locations from one another, each operable to produce a face illumination light beam and including an optical projection device that projects the face illumination light beam along a face illumination direction that is different from a face illumination direction of an adjacent face illumination light source; and a diffractive optical element structured to include an array of different regions of varying optical thickness values that transmit light and located in optical paths of the face illumination light beams to convert each face illumination light beam into a patterned face illumination light beam that includes a pattern of illumination light spots such that different face illumination light beams from the periodic array of face illumination light sources are converted by the diffractive optical element into different patterned face illumination light beams along different illumination directions each including the pattern of illumination light spots to illuminate a person's face for optically detecting a person's face.

In yet another aspect, the disclosed technology can be implemented to provide a method for detecting a person's face by optical sensing. This method includes operating a periodic array of face illumination light sources arranged at different locations from one another to cause each face illumination light source to produce a face illumination light beam; projecting each face illumination light beam along a designated face illumination direction that is different from a face illumination direction of an adjacent face illumination light source; operating a diffractive optical element in optical paths of the face illumination light beams to convert each face illumination light beam into a patterned face illumination light beam that includes a pattern of illumination light spots so that different patterned face illumination light beams along different illumination directions from the face illumination light sources to illuminate a person's face for optically detecting a person's face; capturing images in reflected light from the person's face that are sequentially generated by sequentially turning on one face illumination light source at a time and different face illumination light sources at different times; and processing the captured images to extract 3-dimensional (3D) facial features of the person's face for face identification.

Those and other aspects and their implementations are described in greater detail in the drawings, the description and the claims.

BRIEF DESCRIPTION OF THE DRAWINGS

FIG. 1 is a block diagram of an example of a face identification system based on the disclosed technology.

DETAILED DESCRIPTION

Figure 2A:
FIGS. 2A, 2B and 2C show an example of a face illumination light source using a periodic array of light sources and a diffractive optical element to generate a pattern of illumination light spots for illumination in optical face identification.

Electronic devices or systems may be equipped with user authentication mechanisms to improve the security for accessing the devices. Such electronic devices or system may include, portable or mobile computing devices, e.g., smartphones, tablet computers, wrist-worn devices and other wearable or portable devices, larger electronic devices or systems, e.g., personal computers in portable forms or desktop forms, ATMs, various terminals to various electronic systems, databases, or information systems for commercial or governmental uses, motorized transportation systems including automobiles, boats, trains, aircraft and others.

One of user authentication mechanisms is a face identification ("face ID") based on unique facial features of a person. Different from some implementations of fingerprint sensing devices based on detection and analyses of two dimensional (2D) patterns of fingerprints, a face ID is 3-dimensional (3D) in nature. The detection of such 3-dimensional facial features has unique technical challenges. Optical detection of the 3-dimensional facial features can be achieved by using an optical face ID device 100 shown by an example illustrated in FIG. 1. This optical face ID device 100 includes an optical face ID illumination source 110 that can be activated by a light source controller 112 to produce and project illumination light onto a person's face. The illumination light is designed to be "structured illumination light" with a specially designed 2D spatially varying intensity pattern and can include a pattern of illumination light spots projected on to a face and the reflection of this pattern of illumination light spots is detected by a face imaging device 120 with an array of photosensors. A face ID imaging processing device 130 is provided to receive the imagery information captured by the face imaging device 120 and to process such imagery information to extract the 3-dimensional facial features for face identification. A face ID authentication processing device 140 is provided to compare the extracted 3-dimensional facial features with stored 3-dimensional facial features of an authorized user to determine whether there is a match. The light source controller 112 coupled to the optical face ID illumination source 110 is used to activate the generation of the illumination light by the optical face ID illumination source 110. This can be done, for example, when the face ID operation is initiated by some means in some designs.

The optical face ID illumination source 110 in the example in FIG. 1 should provide a sufficient level of illumination to cast a predetermined optical pattern onto a surface of an object perform sufficiently sensitive optical 3-dimensional mapping of the surface. For example, the optical face ID illumination source 110 is designed to include multiple individual illumination light sources to produce different structured illumination beams, respectively, which are directed to different illumination areas on a target face or object to achieve a desired sufficient level of illumination at the corresponding different illumination areas on the target face or object. The multiple illumination light sources can be implemented in various forms, such as laser diodes, vertical-cavity surface-emitting lasers (VCSELs) or light-emitting diodes (LEDs). The multiple illumination light sources are specifically located at their different locations so that an illumination light source at a designated location is designated to illuminate a particularly designated area on the target and there is a one-to-one correspondence between the illuminated areas on the target and the locations of the illumination light sources. Under this spatial arrangement, each illuminated area on the target is associated with a particular illumination light source at a particular location in the optical face ID illumination source 110. The optical illumination level at a specific area on the target is determined by the optical output power of the corresponding illumination light source and thus is not shared by multiple different illumination areas. The light beams from the multiple illumination light sources are projected as different illumination beams on the target to illuminate different target areas. Such illuminated different target areas are combined to form an illumination pattern which is detected by the optical face ID imaging device 120. This use of one illumination light source for illuminating one subarea or "zone" of the entirety of a desired illumination area having multiple zones for face ID detection allows a relatively low-power and relatively low-cost light source to be used to provide sufficient illumination and the use of different relatively low-power and relatively low-cost light sources for illuminating different subareas of the entire desired illumination area for face ID detection.

The optical face ID illumination source 110 can be designed to implement a periodic array of illumination light sources for ease of fabrication and to reduce the cost. In addition, the optical design for generating the optical pattern for the 3-D mapping of a surface or face can be designed to convert a single illumination beam to carry an optical pattern of illumination light spots for 3-D mapping. Different illumination beams from the different light sources can be combined to illuminate a target surface or a face to be mapped in accordance to the one-to-one correspondence between the illuminated areas on the target and the locations of the illumination light sources as explained below with respect to FIGS. 2A, 2B and 2C. Within each illuminated area or zone by one particular illumination light source from the multiple different illumination light sources, different locations within the same zone are identified and mapped to the captured image based on the spatial coding within the structured pattern spatial pattern as further explained below with respect to examples in FIGS. 5A and 5B.

Figure 2B:
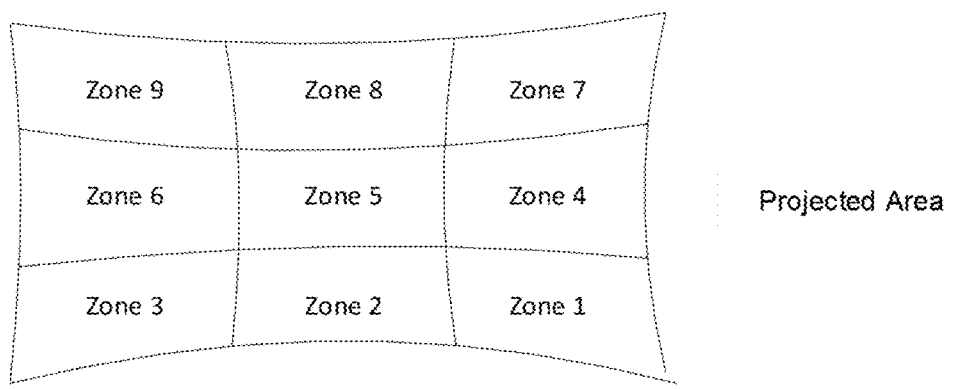
Figure 2C:
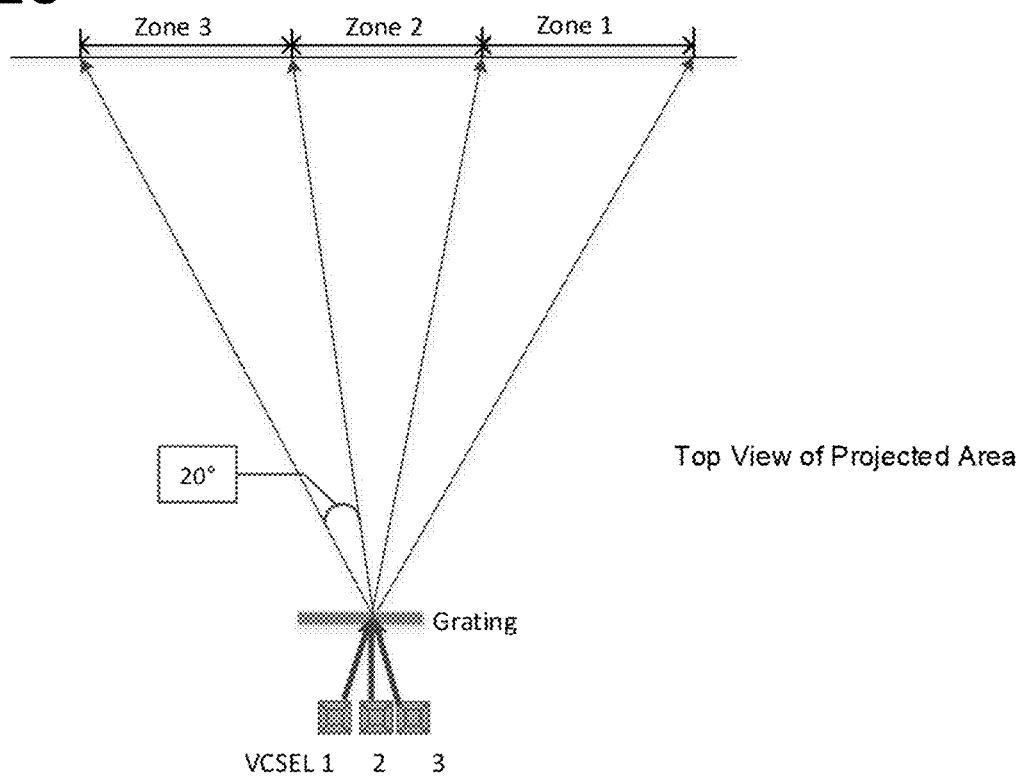

FIGS. 2A, 2B and 2C illustrate one example of such an optical face ID illumination source and includes FIGS. 2A, 2B and 2C showing different views of how different illumination beams from the different light sources can be mapped in accordance to the one-to-one correspondence between the illuminated areas on the target and the locations of the illumination light sources. FIG. 2A shows a top view of an array of VCSELs (or other light-emitting devices) in this example of the optical face ID illumination source in which the VCSELs are arranged in a periodic array which is shown as a two-dimensional array along two orthogonal or perpendicular directions. The spacing between two adjacent VCSELs in one direction is the same and may be the same as or different from the spacing of two adjacent VCSELs in the other direction. In FIG. 2A, the example of a 9-VCSEL array is a rectangular array where in the spacing or period along the horizontal direction as shown is longer than the spacing or period along the vertical direction. This use of a periodic array of VCSELs is simpler to fabricate than other irregular arrays and thus can reduce the fabrication cost.

The different light-emitting devices such as VCSELs in the periodic array in FIG. 2A are respectively used to illuminate different regions on a target surface or a person's face and the different illuminated regions may have some spatial overlap with one another in some implementations and may be separated regions with minimized overlap at the border between two adjacent illuminated regions. FIG. 2A illustrates an example of 9 illuminated regions on a target surface or a person's face by 9 different VCSELs in the periodic array, respectively, where each illuminated region is illuminated by light from a particular VCSEL so that one VCSEL corresponds to a designated illuminated region and two different VCSELs are used to illuminate two different illuminated regions. The illuminated regions collectively cover a desired target surface or a person's face to be optically mapped. Under this illumination design, each VCSEL is used to illuminate a designated illuminated region to provide sufficient optical illumination in order to achieve a desired optical detection sensitivity for the optical mapping. The optical projection and alignment of the different illumination light sources are specifically designed to provide the one-to-one correspondence between the illuminated areas on the target and the locations of the illumination light sources so that in the captured image by the imaging device 120 in FIG. 1 has sub image areas that are uniquely associated with the different illumination light sources.

The optical beam from each VCSEL can be optically modulated, processed or controlled to carry a spatial optical pattern, such as a spatial distribution of illumination spots, to project this spatial optical pattern to illuminate a respective illuminated region on a surface of a target or a person's face to be optically mapped. In some implementations, different optical beams from different VCSELs are optically modulated, processed or controlled to carry the same spatial optical pattern. This spatial optical pattern may include a spatial variation from one location to another location within the spatial optical pattern so that two different locations within the spatial optical pattern have two different local patterns.

Referring back to FIG. 1, the optical detection of the reflected or scattered light of this spatial optical pattern on the target surface or a person's face by the optical face ID imaging device 120 can use the spatial variation from one location to another location within the spatial optical pattern to determine the location from which a received portion of the reflected or scattered light is originated on the target surface or the person's face.

Different optical beams from different light sources such as VCSELs are directed to different illumination directions onto different illuminated regions on the target surface or the person's face. Each illuminated region is uniquely associated with an optical beam along a known and unique illumination direction from a particular VCSEL in the periodic array of VCSELs. In some implementations, an optical projection device is provided to each VCSEL to project the face illumination light beam along an illumination direction that is different from another illumination direction of an adjacent illumination light source, and different VCSELs have their designed different optical projection devices.

FIG. 2C shows an example of three adjacent VCSEL 1, VCSEL 2 and VCSEL 3 and their respective optical projection devices to project their optical illumination light beams along first, second and third illumination directions to Zone 1, Zone 2 and zone 3, respectively, on the target surface or a person's face. For each VCSEL, its optical projection device is structured and placed to receive its output optical beam and projects the optical beam along a unique illumination direction to illuminate its designated zone. In addition, along the optical paths of the optical beams from the VCSELs, a diffractive optical element (DOE) is provided so that each of the optical beams passes through the DOE and is optically modified by the DOE to carry a common spatial optical pattern having a spatial variation from one location to another location within the spatial optical pattern. In some implementations, the DOE can be structured to include an array of different optical transmission regions of varying optical thickness values that transmit light and located in optical paths of the face illumination light beams to convert each optical beam into a patterned face illumination light beam. The different optical projection devices for the different VCSELs direct the optical beams from adjacent different VCSELs to propagate towards the DOE along different illumination directions. The interaction of the DOE with the optical beams converts the different optical beams into different patterned illumination light beams to illuminate different regions of the target surface or a person's face to be optically mapped.

In the example in FIG. 2C, the first optical beam from the first VCSEL 1 on the left side of the second VCSEL 2 and third VCSEL 3 is directed by the first optical projection device placed at the output of the first VCSEL 1 along a first illumination direction towards the right side of the VCSEL 1 to Zone 1 on a target surface or person's face to be mapped; the second optical beam from the second VCSEL 2 between the first VCSEL 1 on the left and the third VCSEL 3 on the right is directed by the second optical projection device placed at the output of the second VCSEL 2 along a second illumination direction towards Zone 2 on the left of Zone 1; and the third optical beam from the third VCSEL 3 on the right side of the second VCSEL 2 is directed by the third optical projection device placed at the output of the third VCSEL 3 along a third illumination direction towards the left side of the third VCSEL 3 to Zone 3 on the left side of Zone 2.

The illuminated zones on the person's face or target surface to be mapped may have different spatial relationships depending on the distance from the person's face or target surface to the face illumination source. In some cases, the two adjacent illuminated zones, Zone 1 and Zone 2, or Zone 2 and Zone 3, may concatenate with each other but may be separated without overlap; in other cases, the two adjacent illuminated zones, Zone 1 and Zone 2, Zone 2 and Zone 3, may spatially overlap and shift in position with each other. In addition, the two adjacent illuminated zones, Zone 1 and Zone 2, Zone 2 and Zone 3, may be separated from each other with a gap in between so that illuminated zones on the person's face or target surface appear as isolated illuminated patches. Those and other different illumination conditions can be handled during the processing of the output from the face imaging device 120 shown in FIG. 1 to extract the 3-D features of the illuminated area on the person's face or target surface.

Figure 3:
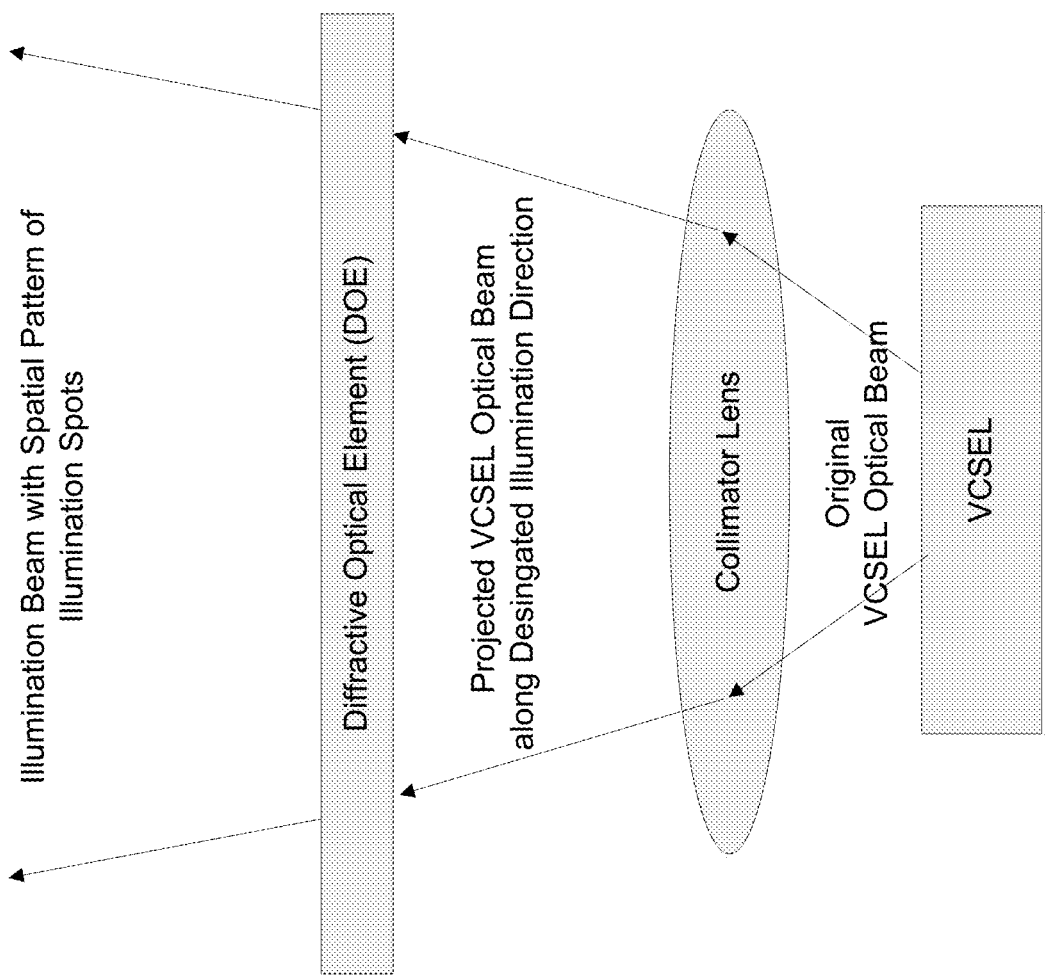
FIG. 3 shows an example an optical projection device for each illumination light source that projects the optical beam to the diffractive optical element.

FIG. 3 shows the relative positions of each VCSEL, the corresponding optical projection device, and the DOE along the optical path of the output beam of the VCSEL. The optical beam produced by the VCSEL is received by the optical projection device and is projected to the DOE and this projected beam may be optically collimated to a desired beam divergence (e.g., 20 degrees as illustrated by the example). The DOE modifies the projected optical beam to produce an output illumination beam with a spatial pattern of illumination spots. The optical projection device can include one or more lenses to provide a desired amount of optical collimation to set a desired beam divergence of the output illumination beam and the one or more lenses may be oriented to direct or steer the projected beam along a designed illumination direction towards the DOE.

Figure 4:
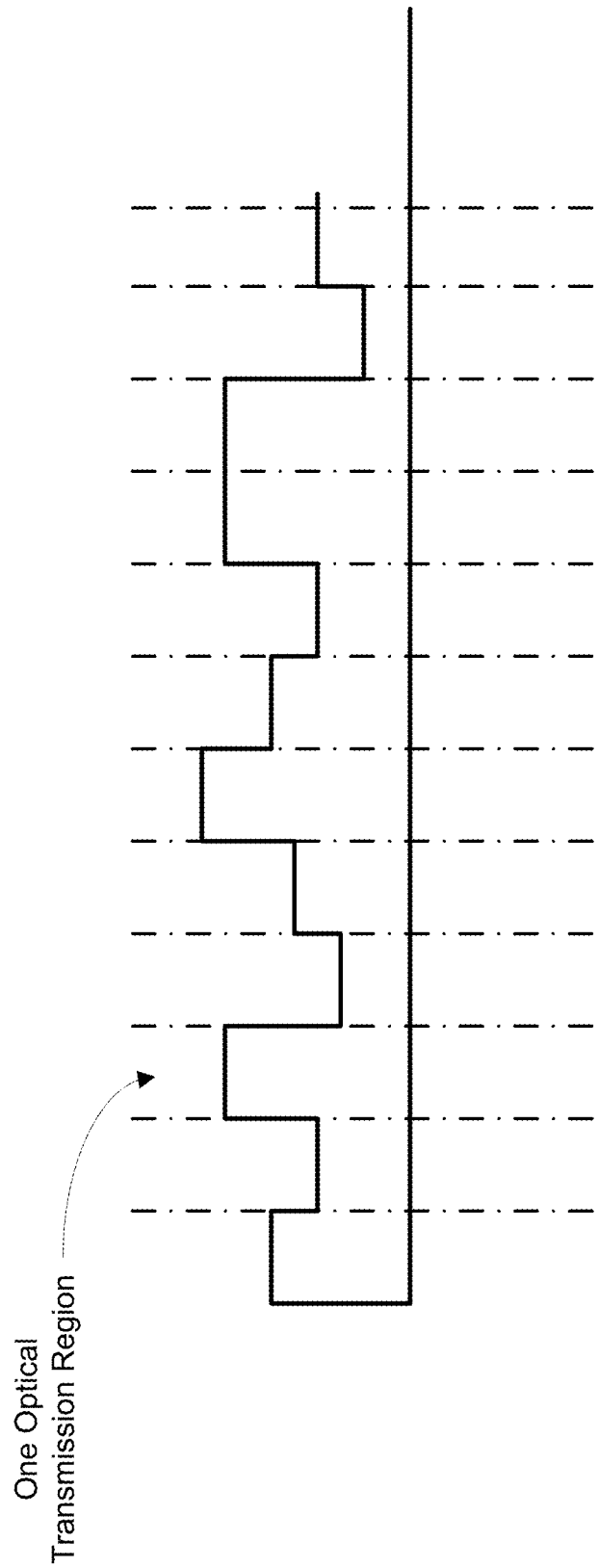
FIG. 4 shows an example of a diffractive optical element as an optical phase mask.

The DOE can be implemented in various configurations, including, for example, an optical transparent plate fabricated with an array of different optical transmission regions of varying optical thickness values to cover an optical beam into a patterned illumination light spots that are spatially distributed to have a unique local pattern of illumination light spots in each local area that is different from other local area with in the pattern. FIG. 4 illustrates a portion of adjacent transmission regions of such a DOE which effectuates an optical phase mask where such transmission regions may be in a periodic array where different transmission regions are of the same size but with their respectively designated thickness values. The output light from a VCSEL has a certain degree of spatial optical coherence and the optical transmission through the transmission regions causes the substantially uniform input optical beam before the DOE to become a pattern of illumination light spots after pass through the DOE. Other optical DOE implementations may also be used.

Figure 5A:
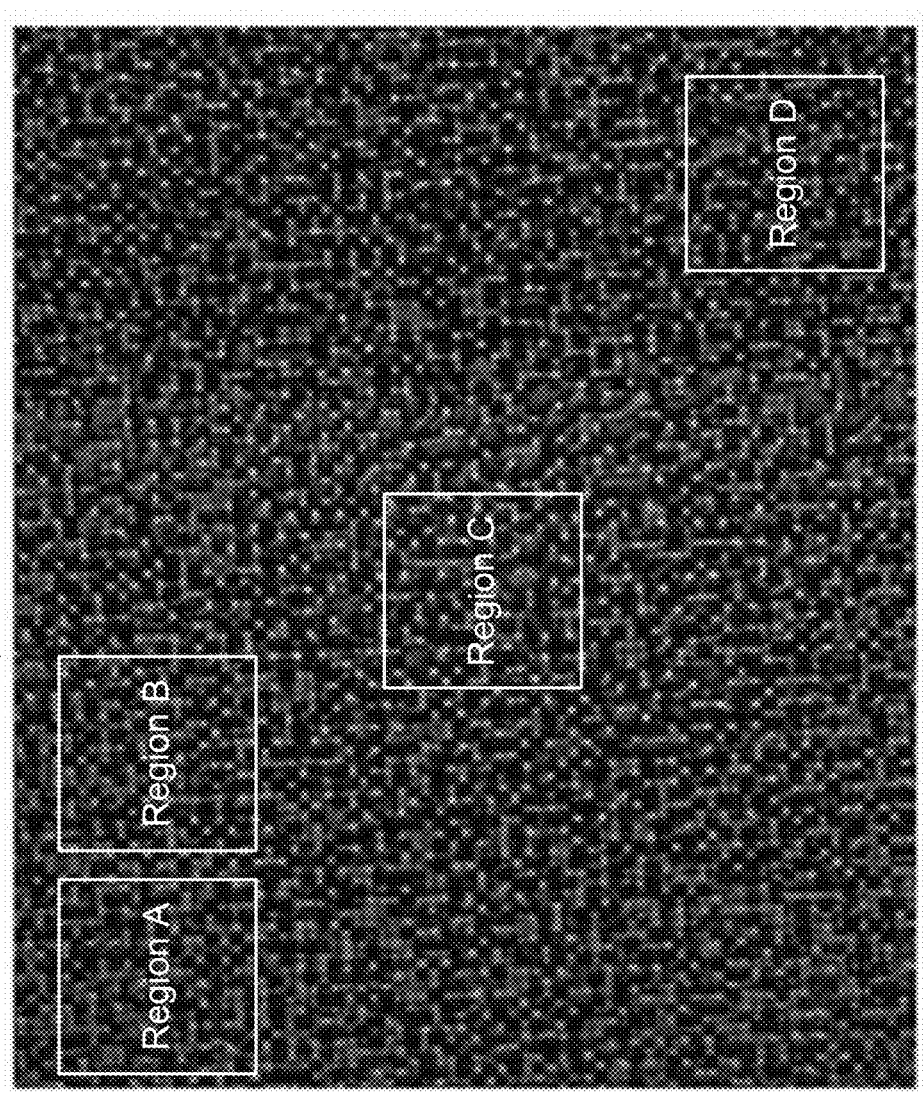
FIG. 5A shows an example of the generated pattern of illumination light spots using a diffractive optical element.

FIG. 5A shows an example of a spatial pattern of illumination light spots in a patterned illumination beam after transmission through a DOE. This pattern is projected by one illumination beam after the DOE to a corresponding illumination zone on the person's face or target surface. The illumination light spots in the pattern vary in position and the spot distribution pattern in on local region in the pattern is unique and different from the spot distribution patterns in other location regions in the pattern. As such, a detection of a local pattern can be uniquely associated with the location of the region in the pattern. As an example, four different local regions A, B, C and D are marked in the example of the patterned illumination light spots in FIG. 5A. The spatial distribution of the light spots in reach of the regions A, B, C and D is unique so that the spatial distribution patterns of the light spots in regions A, B, C and D are different. This allows a detection of a local pattern at a location in an optical sensing array to be associated with a location on the person's face or target surface illuminated by the patterned beam.

In the imaging systems disclosed in this patent document, one or more 2-dimensional imaging sensor arrays with each sensor array with imaging sensing pixels in a 2-dimensional pixel array (e.g., in the optical face ID imaging device 120 in FIG. 1) are used to capture 2-D images of illuminated zones on the person's face or target surface. Due to the use of structured illumination light disclosed in this patent document and based on a fixed relative position between a 2D image sensor and the projector of the structured illumination light, such captured 2D images can be processed to extract the depth information from the 2D images to construct 3D facial features. If the scene is a planar surface without any 3D surface variation, the pattern shown in the acquired image is similar to that of the projected structured-light pattern. However, when the surface in the scene is nonplanar, the geometric shape of the surface distorts the projected structured-light pattern in the captured 2D images. The principle of structured-light 3D surface imaging techniques is to extract the 3D surface shape based on the information from the distortion of the projected structured-light pattern. Accurate 3D surface profiles of objects in the scene can be computed by using various structured-light principles and algorithms. Examples of some techniques for this are disclosed in an 2011 article entitled "Structured-light 3D surface imaging: a tutorial" by Jason Geng in the *Journal Advances in Optics and Photonics* (https://www.osapublishing.org/aop/fulltext.cfm?uri=aop-3-2-128&id=211561) and the 2017 article entitled "Design and quality metrics of point patterns for coded structured light illumination with diffractive optical elements in optical 3D sensors" by Vandenhouten et al. in SPIE journal (https://spie.org/Publications/Proceedings/Paper/10.1117/12.2270248), both of which are incorporated by reference as part of the disclosure of this patent document. The pattern in the structured illumination light is coded, i.e. the position within the whole light pattern can be reconstructed uniquely from a small local window of the pattern, the uniqueness window. Coded patterns with such a uniqueness property are sometimes referred to as Perfect SubMaps (PSM).

Figure 5B:
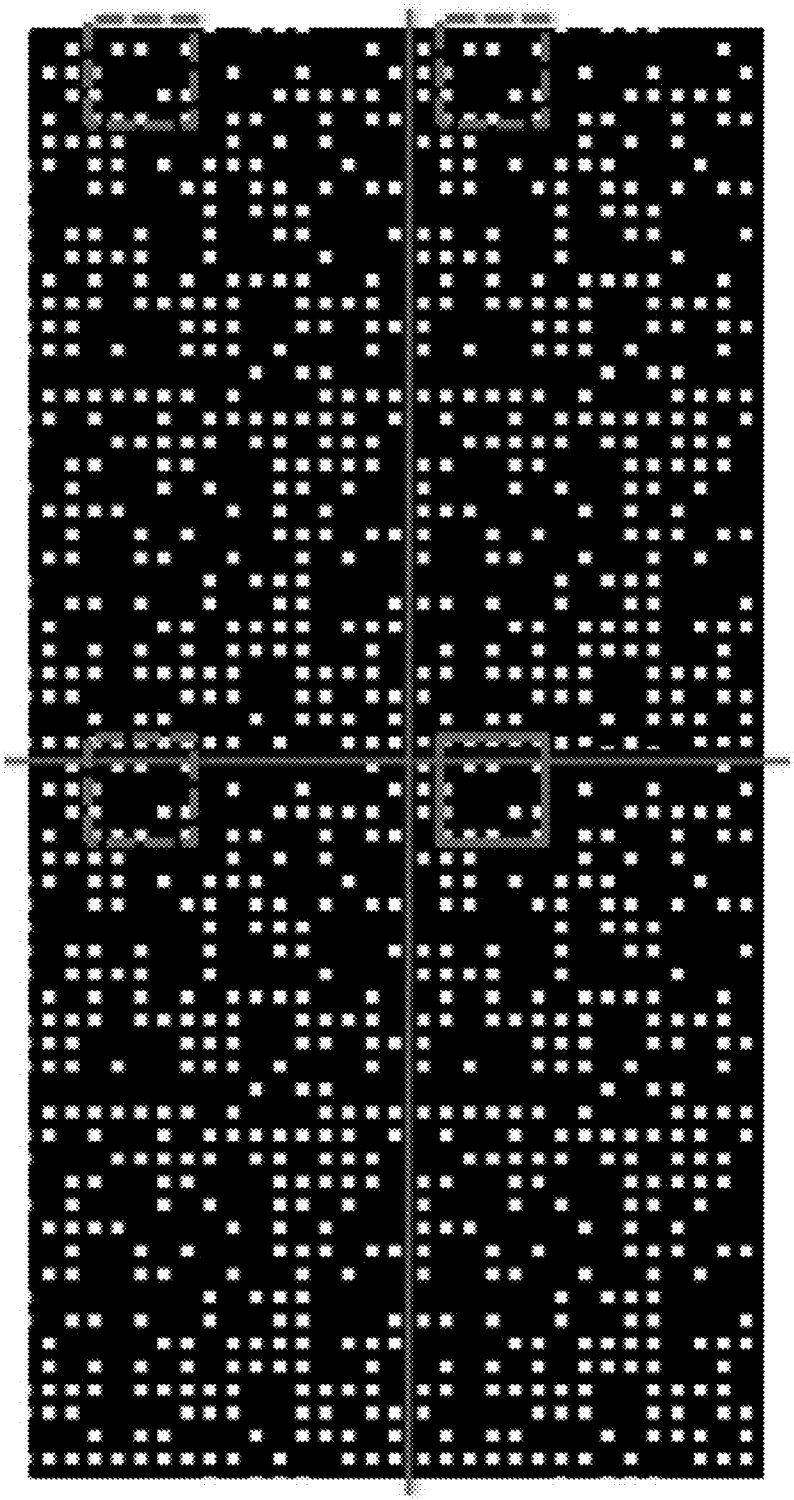
FIG. 5B shows an example of a 2D array pattern constructed by folding pseudo-random sequences for structured illumination light showing four adjacent tiles of a pattern with a 9×9 uniqueness window.

For example, when the structured light is coded with patterns of light dots, the dot position within the whole light pattern should be reconstructed uniquely from a small local subwindow ( u x v ). The concept of 2D encoding pattern techniques is to uniquely label every subwindow ( u x v ) in the projected pattern. Various approaches have been developed for generating the uniqueness-subwindow map. As a specific example, the coding can be implemented by using a De Bruin sequence which is a one-dimensional binary sequence with a k window property that contains each possible code in its subsequences of length k exactly once. Two-dimensional arrays can be constructed from pseudo-random sequences with Flat Autocorrelation Functions. See, e.g., an article entitled "Pseudo-random sequences and arrays" by MacWilliams et al. in Proceedings of the IEEE 1976 (https://www.semanticscholar.org/paper/Pseudo-random-sequences-and-arrays-MacWilliams-Sloane/3bde34d0e01984dc23d4fb5333a2c7d4f7275010). A 2D array can be constructed by folding pseudo-random sequences. FIG. 5B shows an example of a 2D array pattern constructed by folding pseudo-random sequences for structured illumination light showing four adjacent tiles of a pattern with a 9×9 uniqueness window. The uniqueness condition is satisfied even at the border of the tiles.

Referring back to FIG. 1, the different light sources (e.g., VCSELs) in the illumination light source are coupled to different light source driver circuits which are controlled by the controller for the illumination light source. The different VCSELs can controlled to turn on sequentially to illuminate one illumination zone at a time and to illuminate the entire person's face or a target surface sequentially in time to complete the optical mapping of the person's face or the target surface. The captured images by the imaging device in FIG. 1 are processed to determine their respective origins of the regions from the face or surface and are processed to extract 3-D facial features.

In the example in FIG. 3 with an array of light-emitting elements, arranged in a two-dimensional 3×3 layout on a semiconductor substrate, the DOE turns the light beams from the different VCSELs into multiple, mutually-adjacent zones on the projected area, and each zone contains a respective replica of the dot pattern such as the pattern shown in the example in FIG. 5A. The imaging device 120 in FIG. 1 may include a CMOS camera with an array of CMOS imaging sensing pixels. In operation, the CMOS imaging pixels sequentially capture images and are reset.

For the three adjacent VCSELs in FIG. 2C, various sequences of operation may be carried out in some implementations. The following is an example for a sequential illumination operation. First, VCSEL 1 is turned on to illuminate Zone 1, the CMOS imaging device 120 in FIG. 1 captures the Zone 1 image signal while VCSELs 2 and 3 are turned off so that the CMOS imaging device 120 captures the background noise in the Zones 1 and 2 and other zones. Next, VCSEL 1 is turned off, the CMOS imaging device 120 moves captured electronic signal (e.g., signal voltages from sensing pixels) of all zones (Zones 1, 2, 3, etc.) to its build-in storage circuit. Subsequently, VCSEL 2 is turned on while VCSELs 1 and 3 are turned off to perform the imaging sensing. This process is sequentially repeated for VCSELS 3, 4, 5, 6, 7, 8, and 9. Upon completion of the imaging of all zones by turning on only one of the VCSELs at a time, the captured imaging signals are digitized so that the whole target surface or face is captured by synthesizing the digitized images in the above zone by zone sequential imaging process and processed to extract the 3-D topographical features of a person's face or a target surface. The VCSELs can be operated to be tuned on and off in a high power pulse mode at a desired high speed (e.g., 10-1000 Hz) to enhance the signal to noise ratio in the face ID detection by synchronizing the imaging device to the on-and-off clock signal of the pulse mode operation of each VCSEL so that only signals at the same clock are detected and captured. This pulse mode operation of the VCSELs can reduce the heat generated in the continuous wave mode of operating such VCSELs for high power output.

The above use of a periodic array of light sources to produce multiple zones of illumination, respectively, enables simple illumination light source construction in comparison with other methods using irregular arrangements of light sources and can also be implemented using high-power pulse operation of each light source such as a VCSEL to reduce the number of the light sources for face ID detection and thus the cost of the face ID system.

Figure 6:
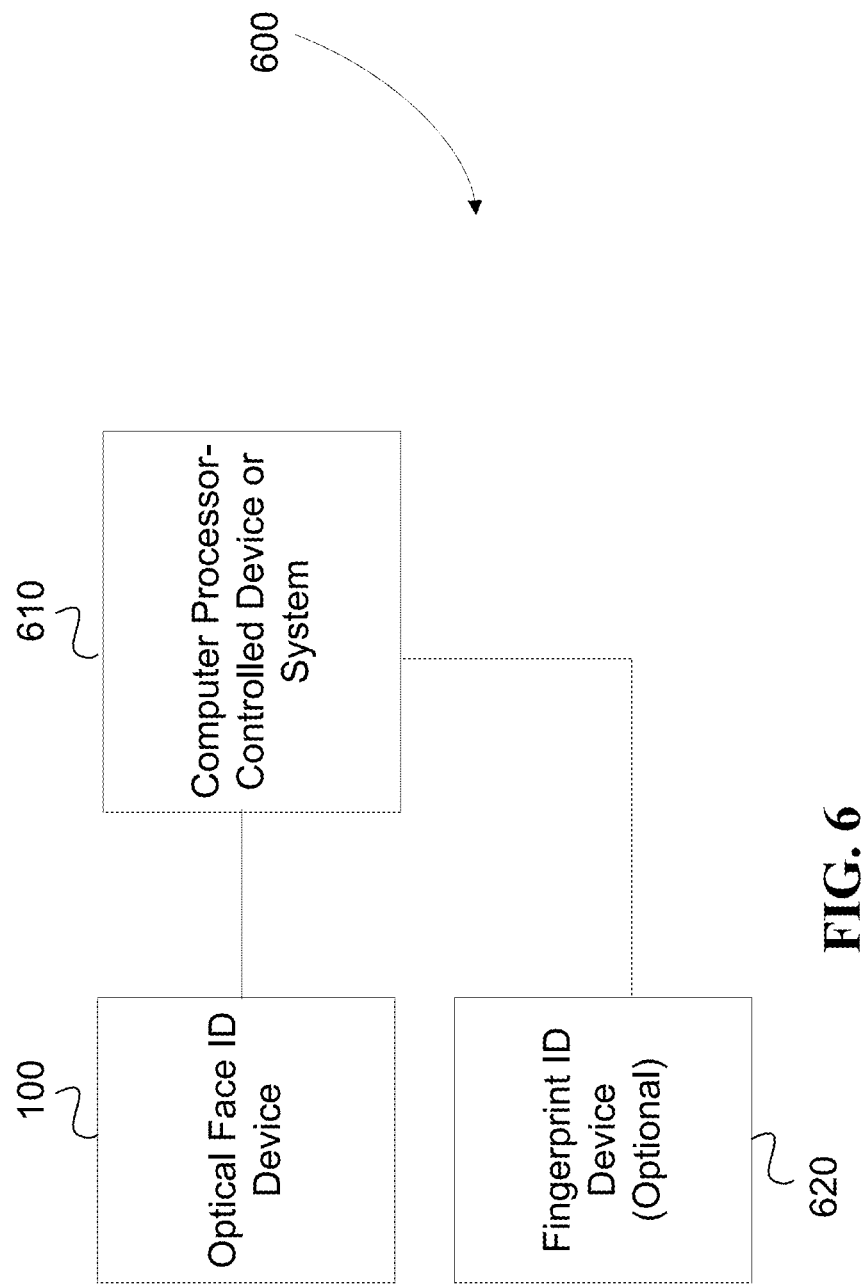
FIG. 6 is a block diagram of an example of a system with an optical face ID device as shown in FIG. 1 for capturing and processing face images and determining whether an input face image is one for an authorized user for a computer processor controlled device or system.

FIG. 6 is a block diagram of an example of a system 600 with an optical face ID device 100 as shown in FIG. 1 for capturing and processing face images and determining whether an input face image is one for an authorized user for a computer processor controlled device or system 610. In operation, the access to the device 610 is controlled by the Face ID Authentication Processing Device 140 shown in FIG. 1. For example, the optical face ID device 100 may be implemented at an ATM as the system 610 to determine the face ID of a customer requesting to access funds or other transactions. Based on a comparison of the customer's face image obtained from the optical imaging device 120 to the stored face ID information, the optical face ID device 100 may, upon a positive identification, cause the ATM system 610 to grant the requested access to the user account, or, upon a negative identification, may deny the access. For another example, the device or system 610 may be a smartphone or a portable device and the optical face ID device 100 is a module integrated to the device 610. For another example, the device or system 610 may be a gate or secured entrance to a facility or home that uses the optical face ID device 100 to grant or deny entrance. For yet another example, the device or system 610 may be an automobile or other vehicle that uses the optical face ID device 100 to link to the start of the engine and to identify whether a person is authorized to operate the automobile or vehicle. In some implementations, a fingerprint sensor system 620 may be optionally provided along with the optical face ID device 100 to provide user options in accessing the system or require both face ID and fingerprint ID to access the system or device 610.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An electronic device capable of detecting a person's face by optical sensing, comprising:
    a face illumination source that includes:
    a periodic array of face illumination light sources arranged at different locations from one another, each operable to produce a face illumination light beam of a plurality of face illumination light beams and including an optical projection device that projects the face illumination light beam along a face illumination direction that is different from a face illumination direction of an adjacent face illumination light source; and
    a diffractive optical element structured to include an array of different regions with designated optical thickness values that transmit light to convert each face illumination light beam into a patterned face illumination light beam that includes a pattern of illumination light spots, such that the different face illumination light beams from the periodic array of face illumination light sources are converted by the diffractive optical element into different patterned face illumination light beams along different illumination directions each including the pattern of illumination light spots to illuminate the person's face for optically detecting the person's face, wherein the diffractive optical element is located in optical paths of the plurality of face illumination light beams.

2. The device as in claim 1, wherein:
    the periodic array of face illumination light sources is structured to render the different patterned face illumination light beams along different illumination directions to illuminate different adjacent regions of the person's face without spatial overlap between adjacent regions.

3. The device as in claim 1, wherein:
    the periodic array of face illumination light sources is structured to render the different patterned face illumination light beams along different illumination directions to illuminate different adjacent regions of the person's face with partial spatial overlap between adjacent regions.

4. The device as in claim 1, wherein:
    the array of different regions of varying optical thickness values of the diffractive optical element is structured to cause the illumination light spots to be spatially distributed to have a unique local pattern of illumination light spots in each local region in the spatial pattern that is different from other local regions in the spatial pattern.

5. The device as in claim 4, comprising:
    a face imaging device located relative to the face illumination source to receive illumination light from the person's face illuminated by the different patterned face illumination light beams along different illumination directions that carries a person's facial topographical information, wherein the face imaging device captures the spatial optical pattern in each image that is associated with a location on the face based on the spatial optical pattern.

6. The device as in claim 1, wherein:
    in the periodic array of face illumination light sources, the optical projection device in each face illumination light source includes one or more collimation lenses.

7. The device as in claim 1, wherein:
    in the periodic array of face illumination light sources, each face illumination light source includes a semiconductor laser to emit a face illumination light beam.

8. The device as in claim 1, wherein:
    in the periodic array of face illumination light sources, each face illumination light source includes a vertical-cavity surface-emitting laser to emit a face illumination light beam.

9. The device as in claim 1, further comprising:
    a face imaging device located relative to the face illumination source to receive illumination light from the person's face illuminated by the different patterned face illumination light beams along different illumination directions that carries a person's facial topographical information; and
    a face imaging processing device coupled to receive output of the face imaging device and to extract the person's facial topographical information for face identification.

10. The device as in claim 1, wherein:
    the face illumination source includes an illumination controller coupled to control the face illumination light sources, respectively, to operate in a pulse mode to produce high power light pulses in each face illumination light beam; and
    the device further includes an imaging device to capture images in reflected light from the face illuminated by the pattern of illumination light spots in synchronization with the pulse mode.

11. The device as in claim 1, wherein the face illumination light sources include light emitting diodes.

12. The device as in claim 1, wherein the face illumination light sources include laser diodes.

13. The device as in claim 1, wherein the face illumination light sources include vertical-cavity surface-emitting lasers (VCSELs).

14. A method for detecting a person's face by optical sensing, comprising:
- operating a periodic array of face illumination light sources arranged at different locations from one another to cause each face illumination light source to produce a face illumination light beam;
- projecting each face illumination light beam along a designated face illumination direction that is different from a face illumination direction of an adjacent face illumination light source;
- operating a diffractive optical element in optical paths of the face illumination light beams to convert each face illumination light beam into a patterned face illumination light beam that includes a pattern of illumination light spots so that different patterned face illumination light beams along different illumination directions from the face illumination light sources to illuminate the person's face for optically detecting the person's face, wherein the diffractive optical element is structured to include an array of different regions of varying optical thickness values to cause the pattern of illumination light spots to have a unique local pattern of illumination light spots in each local region that is different from other local regions;
- capturing images in reflected light from the person's face that are sequentially generated by sequentially turning on one face illumination light source at a time and different face illumination light sources at different times; and
- processing the captured images to extract 3-dimensional facial features of the person's face for face identification.

15. The method as in claim 14, further comprising:
- controlling the face illumination light sources, respectively, to operate in a pulse mode to produce high power light pulses in each face illumination light beam; and
- synchronizing capturing of the images and a timing of the pulse mode to improve a signal-to-noise ratio in the captured images.

16. The method as in claim 14, wherein:
the method includes using the spatial pattern to determine the location on the face from which an image is generated by optical reflection.

17. The method as in claim 14, wherein:
in the periodic array of face illumination light sources, the optical projection device in each face illumination light source includes one or more collimation lenses.

18. A system, comprising:
- a periodic array of face illumination light sources arranged at different locations from one another, each operable to produce a face illumination light beam and including an optical projection device that projects the face illumination light beam along a face illumination direction that is different from a face illumination direction of an adjacent face illumination light source;
- a diffractive optical element structured to include an array of different regions of varying optical thickness values that transmit light and located in optical paths of the face illumination light beams to convert each face illumination light beam into a patterned face illumination light beam that includes a pattern of illumination light spots, such that the different face illumination light beams from the periodic array of face illumination light sources are converted by the diffractive optical element into different patterned face illumination light beams along different illumination directions each including the pattern of illumination light spots to illuminate a person's face for optically detecting the person's face;
- a face imaging device located relative to the face illumination source to receive illumination light from the person's face illuminated by the different patterned face illumination light beams along different illumination directions that carries a person's facial topographical information;
- a face imaging processing device coupled to receive output of the face imaging device and to extract the person's facial topographical information for face identification; and
- a face identification authentication processing device coupled to receive the extracted facial topographical information and operable to compare the extracted facial topographical information with known facial topographical information of an authorized user to determine whether the extracted facial topographical information matches the known facial topographical information of the authorized user.

19. The system as in claim 18, further comprising a mobile device and the face identification authentication processing device controls an access by a user to the mobile device.

20. The system as in claim 18, further comprising a computer controlled system and the face identification authentication processing device controls an access by a user to the computer controlled system.

* * * * *